(12) United States Patent
Cha et al.

(10) Patent No.: US 9,780,825 B2
(45) Date of Patent: Oct. 3, 2017

(54) COMPUTING DEVICE SLEEVES

(71) Applicant: Hewlett-Packard Development Company, L.P., Houston, TX (US)

(72) Inventors: Dong Ryul Cha, Santa Clara, CA (US); Yoon Jung Byun, Redwood City, CA (US); Jae-Kyu Jung, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/957,022

(22) Filed: Dec. 2, 2015

(65) Prior Publication Data
US 2017/0163304 A1 Jun. 8, 2017

(51) Int. Cl.
*G06F 1/16* (2006.01)
*A45C 11/00* (2006.01)
*H04B 1/3888* (2015.01)

(52) U.S. Cl.
CPC ............ *H04B 1/3888* (2013.01); *A45C 11/00* (2013.01); *G06F 1/1613* (2013.01); *A45C 2011/003* (2013.01)

(58) Field of Classification Search
CPC .... H04M 1/0214; H04M 1/23; H04M 1/0247; H04M 1/0237; H04B 1/3833
See application file for complete search history.

(56) References Cited

U.S. PATENT DOCUMENTS

| | | | |
|---|---|---|---|
| 9,425,848 B2 * | 8/2016 | Fathollahi | G06F 1/1681 |
| 9,426,905 B2 * | 8/2016 | Bathiche | G06F 1/1626 |
| 2012/0268911 A1 * | 10/2012 | Lin | G06F 1/1628 |
| | | | 361/807 |
| 2014/0139989 A1 | 5/2014 | Mori et al. | |
| 2015/0036273 A1 | 2/2015 | Hui et al. | |
| 2016/0134322 A1 * | 5/2016 | Lee | H04B 1/3888 |
| | | | 455/575.3 |
| 2016/0187937 A1 * | 6/2016 | Ahee | G06F 1/1681 |
| | | | 361/679.09 |
| 2017/0153667 A1 * | 6/2017 | Suckle | G06F 1/1632 |

FOREIGN PATENT DOCUMENTS

| | | |
|---|---|---|
| WO | WO-2014110557 A2 | 7/2014 |
| WO | WO-2015070419 A1 | 5/2015 |

OTHER PUBLICATIONS

Cunningham, A, "Lenovo Unveils Slew of Tablets with Keyboards, Laptops with Touchscreens", Oct 10, 2012~http://arstechnica.com ~ 6 pages.
Mastin, M, "Asus Transformer Prime Tf201 Mobile Docking Station Review", Mar. 13, 2012 ~ PC Advisor ~ 4 pages.
Web Slog ~ "Acer Announces New Devices Including New 2-in-1 Laptop and 23-inch All-in-ones", Apr. 29. 2014 ~ 10 pages.
Webpage ~"Apple Pushing for Patent on Versatile Tablet Docking Station", Nov. 1997 ~ http://forums.appleinsider.com ~ 12 pages.

\* cited by examiner

*Primary Examiner* — Bobbak Safaipour
(74) *Attorney, Agent, or Firm* — HP Patent Department

(57) ABSTRACT

Examples described herein include examples of a computing device sleeve comprising a main body element comprising a top surface and a bottom surface, the bottom surface comprising a recessed region to store a tablet computing device in a position to protect a display device of the tablet computing device, and the top surface comprising a user input device and docking slot to receive the tablet computing device, and a top cover element coupled to a first side of the main body element and movable to selectively cover the top surface or the bottom surface.

20 Claims, 10 Drawing Sheets

COMPUTING DEVICE SLEEVES

BACKGROUND

Tablet computers, smart phones, and other computing devices that use touch sensitive user interface devices can provide a hands-on user interface experience for entering user input. For example, hands gestures, such as single- and multiple-finger swipes, scrolling, pinches, and the like, performed on a touchscreen surface provide an intuitive and dynamic user interface for performing various simple and complex tasks. However, touchscreen devices can only simulate some user interface devices (e.g., keyboards, keypads, etc.) and are, thus, sometimes limited in their utility. In addition, most contemporary touchscreens are susceptible to damage and scratches from impact and abrasion.

DETAILED DESCRIPTION

Implementations of the present disclosure include an accessory sleeve for use with and protecting a mobile computing device. For example, implementations of the present disclosure can include a keyboard device that includes a protective cover and a slot for storing a tablet computing device. Such implementations can be used to store and protect a tablet computing device from physical damage when not in use. When the tablet computing device is in use, various implementations of the present disclosure can be used as a stand and peripheral user input device for interacting with the tablet computing device. When deployed as a stand, the protective cover can be folded over to form a base to provide additional stability to the accessory sleeve during use. User input devices in such example implementations can include a keyboard, a keypad, a touchpad, a scrollbar, and the like.

Example implementations of the present disclosure that include tablet stand or support functionality can include features for supporting a tablet computing device for use in a laptop or desktop configuration. For example, a tablet computing device sleeve may include a slot or other element for supporting a tablet computer in a vertical, near vertical, or reclined position to allow a user to easily view a display device of the tablet computing device while manipulating other user interface controls (e.g., keyboard, touchpad, scrollbar, etc.). While the computing device sleeve is in such a configuration, a folding element, such as the protective cover, can be configured to increase the footprint or leverage of the sleeve to help prevent the computing device from tipping. Such stabilizing features of the various implementations the present disclosure can aid in providing a stable configuration for a user to use a touchpad or touchscreen integrated into the computing device while it is supported by the sleeve. As used herein, the term "tablet computing device" is used generically to refer to any computing device with, or that can be configured or arranged to have, a planar or significantly planar form factor. For example, the term "tablet computing device" can refer to a tablet computer, a smartphone, a convertible laptop computer, and the like.

Figure 1:
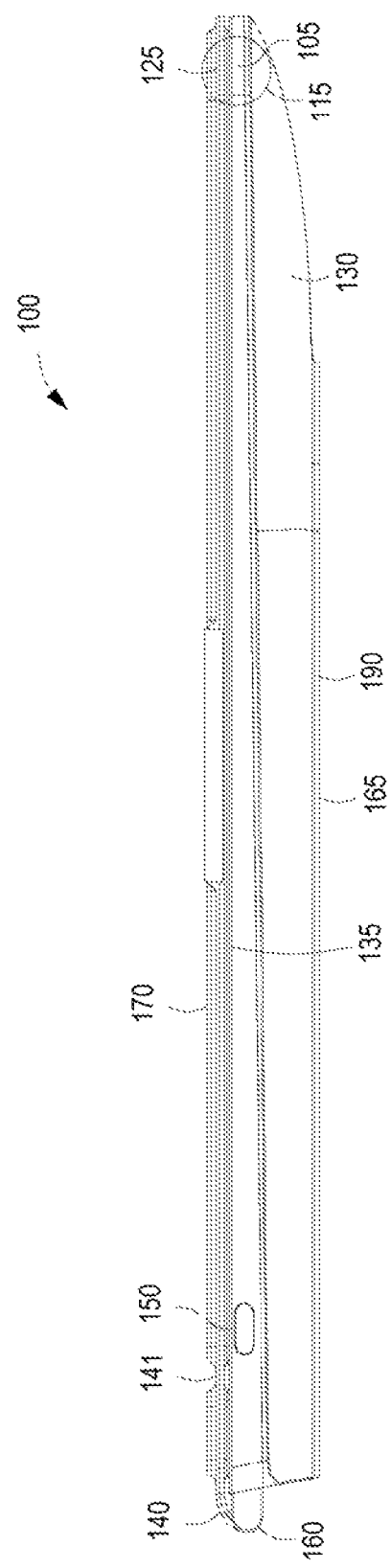
FIG. 1 illustrates a side view of an example computing device sleeve.

FIG. 1 depicts a side view of an example computing device sleeve 100 configured in a closed configuration, according to implementations of the present disclosure. A closed configuration refers to the configuration in which a cover element, such as flap, is disposed over a user interface device included in the computing device sleeve 100 for protection. As shown in FIG. 1, the computing device sleeve 100 can include two components. The first component can include the main body element 130, and the second component can include the top cover element 170. The top cover element 170 can be coupled to the main body element 130 by a flexible element 140 at a connection or pivot region 160. As such, the cover element 170 can move relative to the main body element 130 to cover or uncover a top surface 135 of the main body element 130.

While in the closed position depicted in FIG. 1, the cover element 170 can be held in place relative to the main body element 130 by a magnetic latching element 115. In various example implementations, the magnetic latching element 115 can include magnets or magnetic elements 105 in the main body element 130 and corresponding magnets or magnetic elements 125 in the top cover element 130. The magnetic latching element 115 can include multiple magnets disposed in various positions along the edge of the top cover element 170 and/or corresponding positions along the edge of the main body element 130 to hold the top cover element in place relative to the main body element 130.

For the sake of simplicity and clarity, the top cover element 170 and the main body element 130 are described as being separate elements coupled to one another. However, in various example implementations of the present disclosure, the main body element 130 and the top cover element 170 can be formed as a single piece. For example, at least some of the main body element 130 and the top cover element 170 can be formed as a single injection molded part.

As shown, the top cover element 170 can include a flexible element 140 to couple it to the main body element 130 at a pivot region 160. The pivot region 160 can include a hinge or a permanent or detachable connector to couple the flexible element 140 to the main body element 130. The top cover element 170 may also include a secondary flexible region 141 to provide a secondary bending or pivot region at an intermediate point between the magnet or magnetic element 125 and the pivot region 160.

As also shown in FIG. 1, the main body element 130 can include a bottom surface 165 and a top surface 135. In the example shown, the top surface 135 of the main body component 130 can be disposed adjacent to a surface of the top cover element 170 when in the closed position depicted.

The main body element 130 can also include a recessed region for accepting and protecting an associated or corresponding computing device, such as tablet computer.

In implementations in which the computing device sleeve 100 includes a power supply, the main body element 130 can include external controls such as power or pairing button 150. For example, button 150 can be used to turn on an integrated keyboard or initiate pairing protocols using a near field communication (NFC) communication with an associated computing device.

Figure 2A:
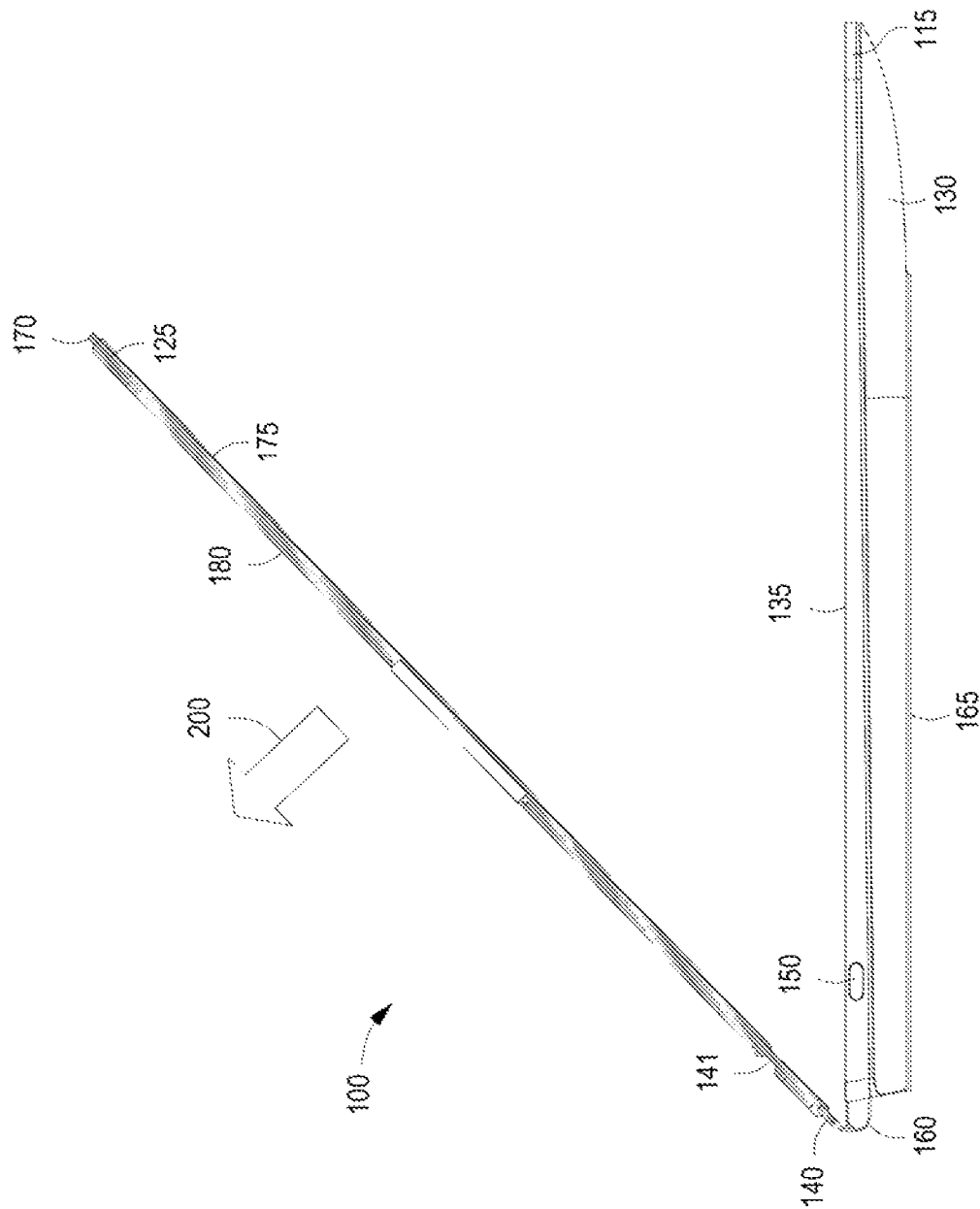
FIG. 2A illustrates a side view of an example computing device sleeve in a semi open position.

FIG. 2A depicts a side view of the computing device sleeve 100 in a semi open state. Configuring the computing device sleeve 100 into a semi open state can include moving the top cover element 170 in a direction indicated by arrow 200 relative to the main body element 130. For example, the top cover element 170 can be lifted and folded over the side of the main body element 130 on which the pivot region 160 is disposed. In this configuration, it is possible to see that the top cover element 170 can include a first surface 180 and a second surface 175. When in the closed position, the second surface 175 is adjacent to the top surface 135 of the main body element 130.

As the top cover element 170 is moved along the direction indicated by arrow 200, it can flexibly bend at flexible regions 140 and 141. Accordingly, flexible regions 140 and 141 can include a flexible material, such as a plastic, fabric, metal, or the like. Other regions of the top cover element 170 can include a rigid body element made of a rigid or semi rigid material. The main rigid body can include a planar element made of the rigid or semi rigid material. In some implementations, the top cover element 170 can include rigid or semi rigid materials such as medium density fiber board (MDF), cardboard, plastic, metal, wood, or some composite thereof. The rigid or semi rigid material of the top cover element 170 can be coated, wrapped, or clad in another material such as plastic, vinyl, fabric, and the like to provide additional protection and aesthetic design.

Figure 2B:
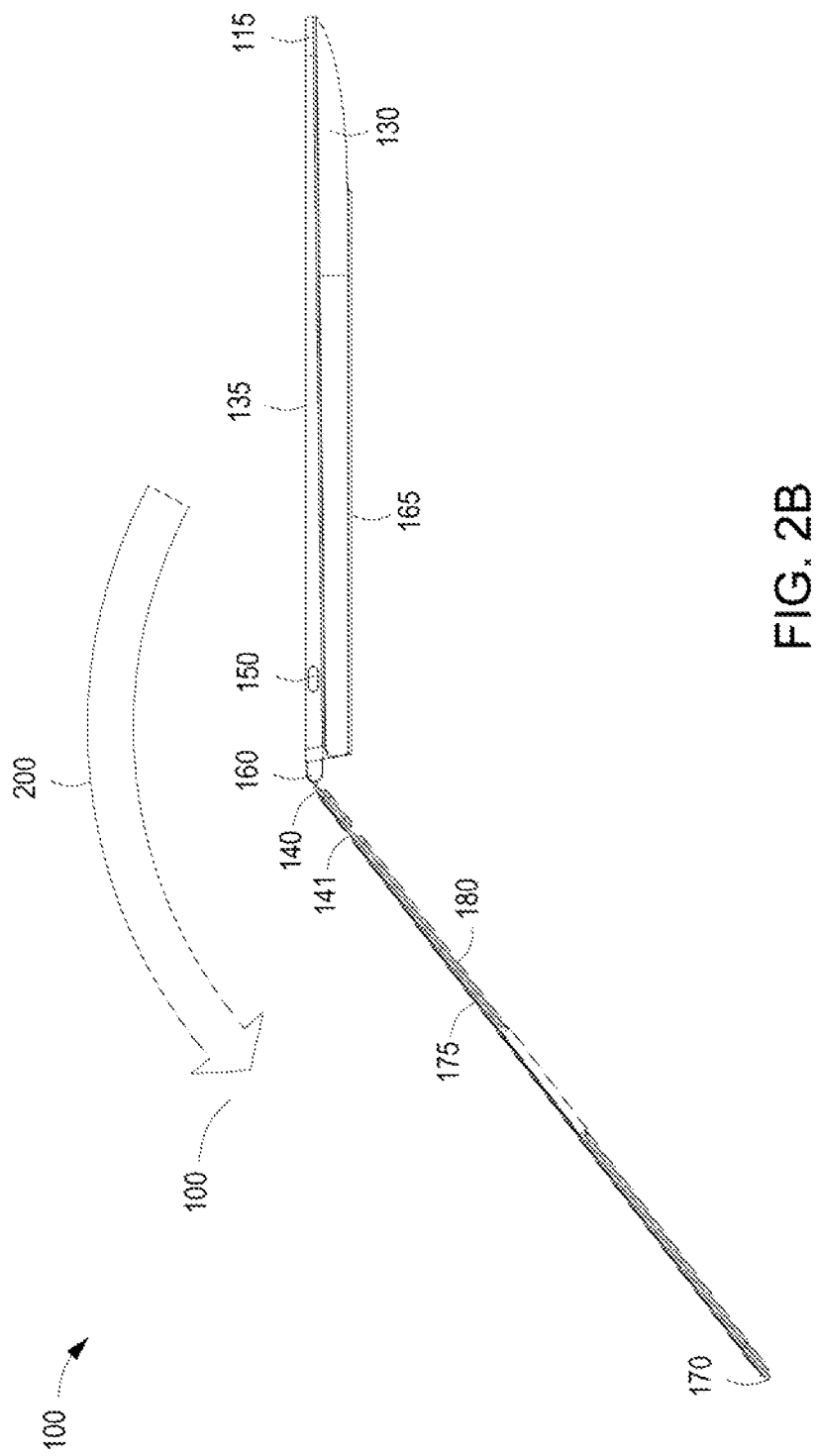
FIG. 2B illustrates a side view of an example computing device leave in an open position.

FIG. 2B depicts the computing device sleeve 100 in yet another a semi open state. To reach the semi open state depicted in FIG. 2B, the top cover element 170 is moved further along the direction indicated by arrow 200 rotating about the pivot region 160.

Figure 2C:
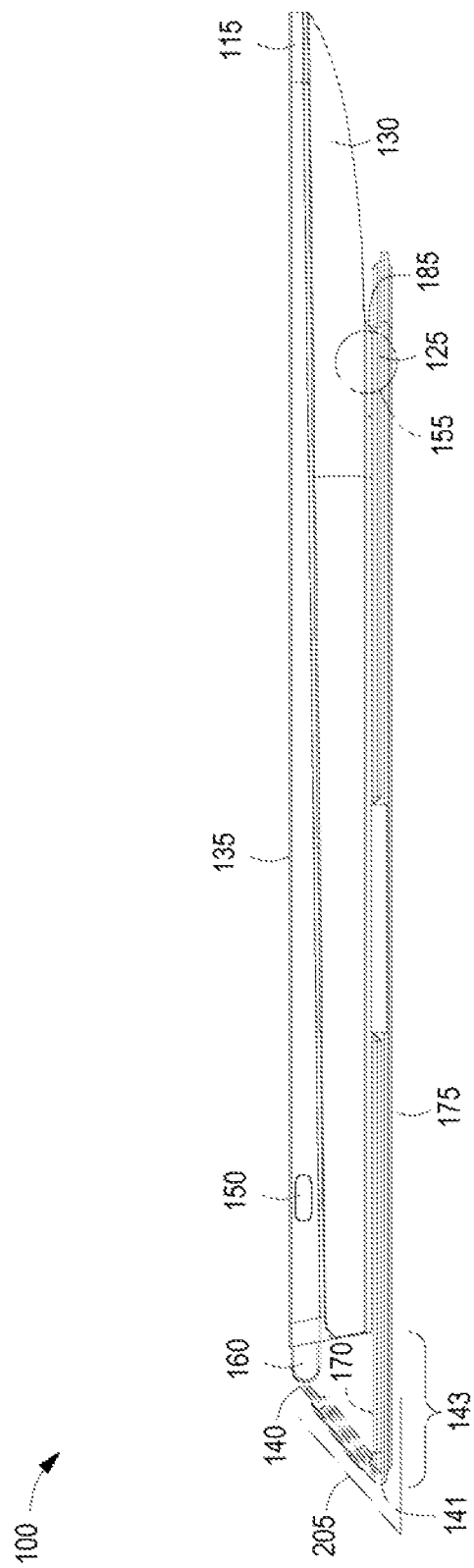
FIG. 2C illustrates a side view of an example computing device sleeve in a folded open position.

FIG. 2C depicts the computing device sleeve 100 in a fully open state. In the configuration depicted in FIG. 2C, the top cover portion has been folded around the pivot region 160 by bending around flexible regions 140 and 141. In such implementations, a region 143 of the top cover element extends a distance beyond the pivot region 160 of the main body element 130.

Accordingly, the portion of the top cover element 130 disposed between the flexible regions 141 and 140 form an angle 205 with the portion of the top cover element 170 between the flexible region 141 and the magnetic latching region 155.

The dimensions of the region 143 of the top cover element 170 can be maintained by the connection formed between the top cover element 170 and the main body element 130 by the magnetic latching mechanism 155. The magnetic latching mechanism 155 can include a magnet or magnetic element 125 disposed in or on the first surface 180 and a magnet or magnetic element 185 disposed in or on the bottom surface 165 of the main body element 130. The magnetic latching mechanism 155 can exert sufficient force to maintain the dimensions of region 143 and/or angle 205.

Figure 3A:
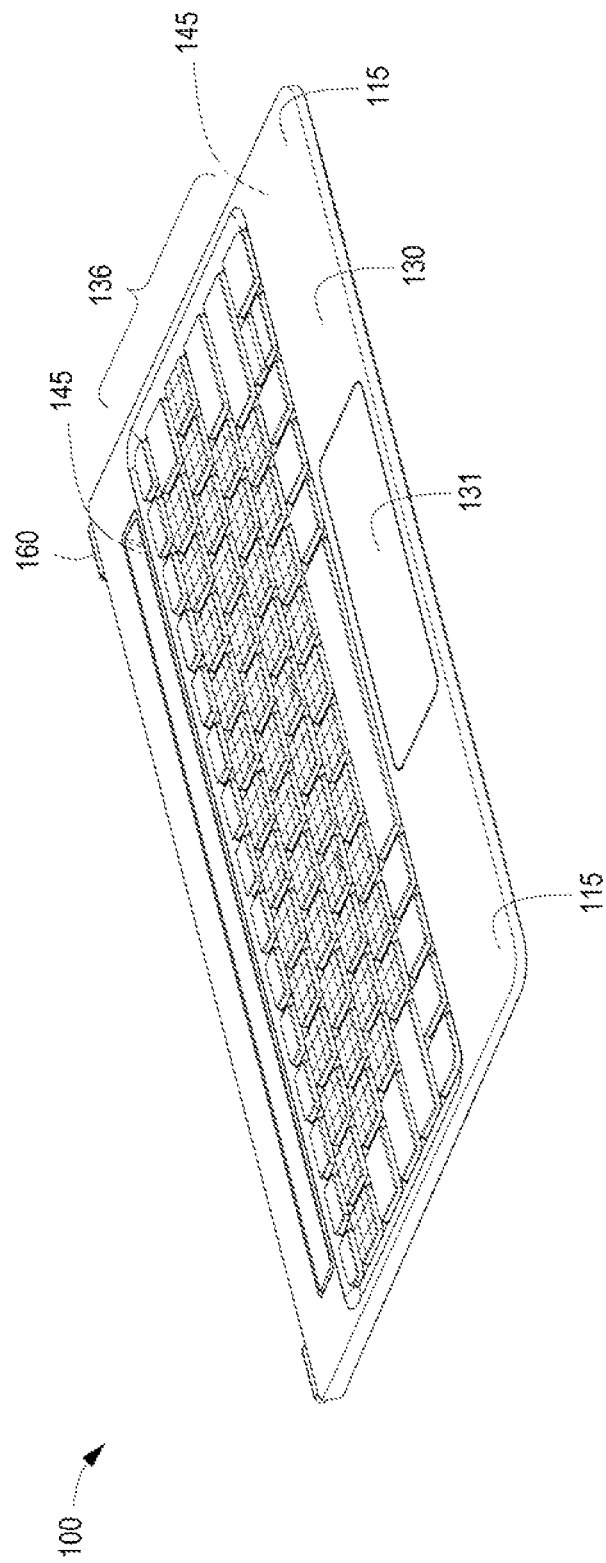
FIG. 3A illustrates an isometric view of an example computing device sleeve in a folded open position.

FIG. 3A depicts an isometric view of the top surface 135 of the main body component 130 where the top cover element 170 is in the fully open state depicted in FIG. 2C.

As shown in FIG. 3A, the magnet or magnetic elements 115 can be disposed in multiple locations on or in the top surface 135.

In the example implementation shown in FIG. 3A, the top surface 135 of the main body component 130 can include a docking slot 145, buttons or a keyboard 136, and/or a touchpad 131. While not shown, the main body element 130 can also include components for implementing the functionality for connecting user interface devices, such as keyboard 136 and touchpad 131, with a corresponding or paired tablet computing device.

A computing device, such as a tablet computer or smartphone, can be inserted into the docking slot 145 and cantilevered toward the pivot region 160 into a position to provide a user with a view of the tablet's display device.

Figure 3B:
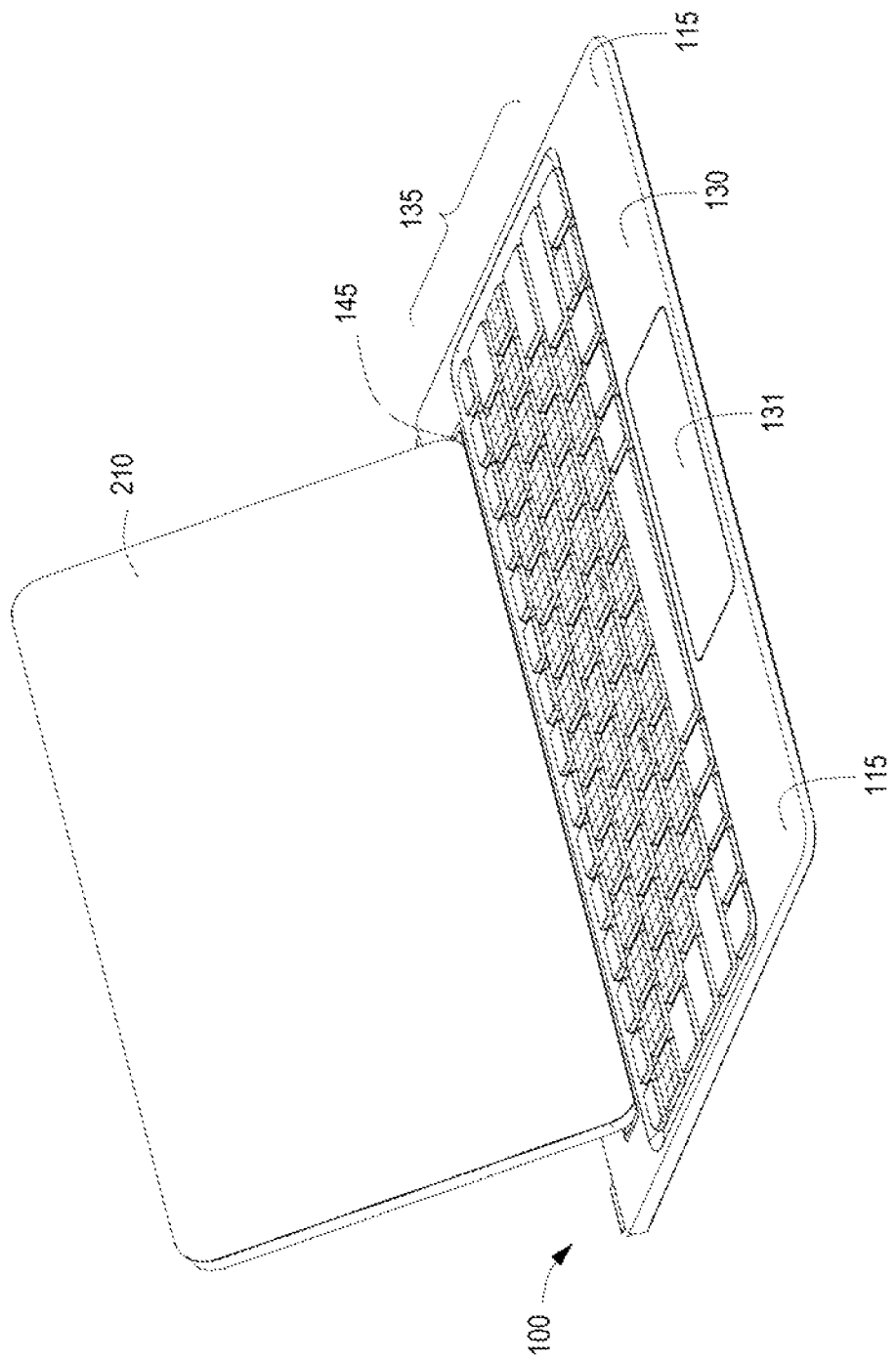
FIG. 3B illustrates an isometric view of an example computing device sleeve with an associated computing device.

FIG. 3B depicts a view of the computing device sleeve 100 with a corresponding tablet computer 210 disposed in the docking slot 145. As shown, the configuration of the docking slot 145 can mate with the thickness, edge, and/or edge profile of the tablet computer 210 to use its weight to cantilever itself against the internal surfaces of the docking slot 145.

Figure 3C:
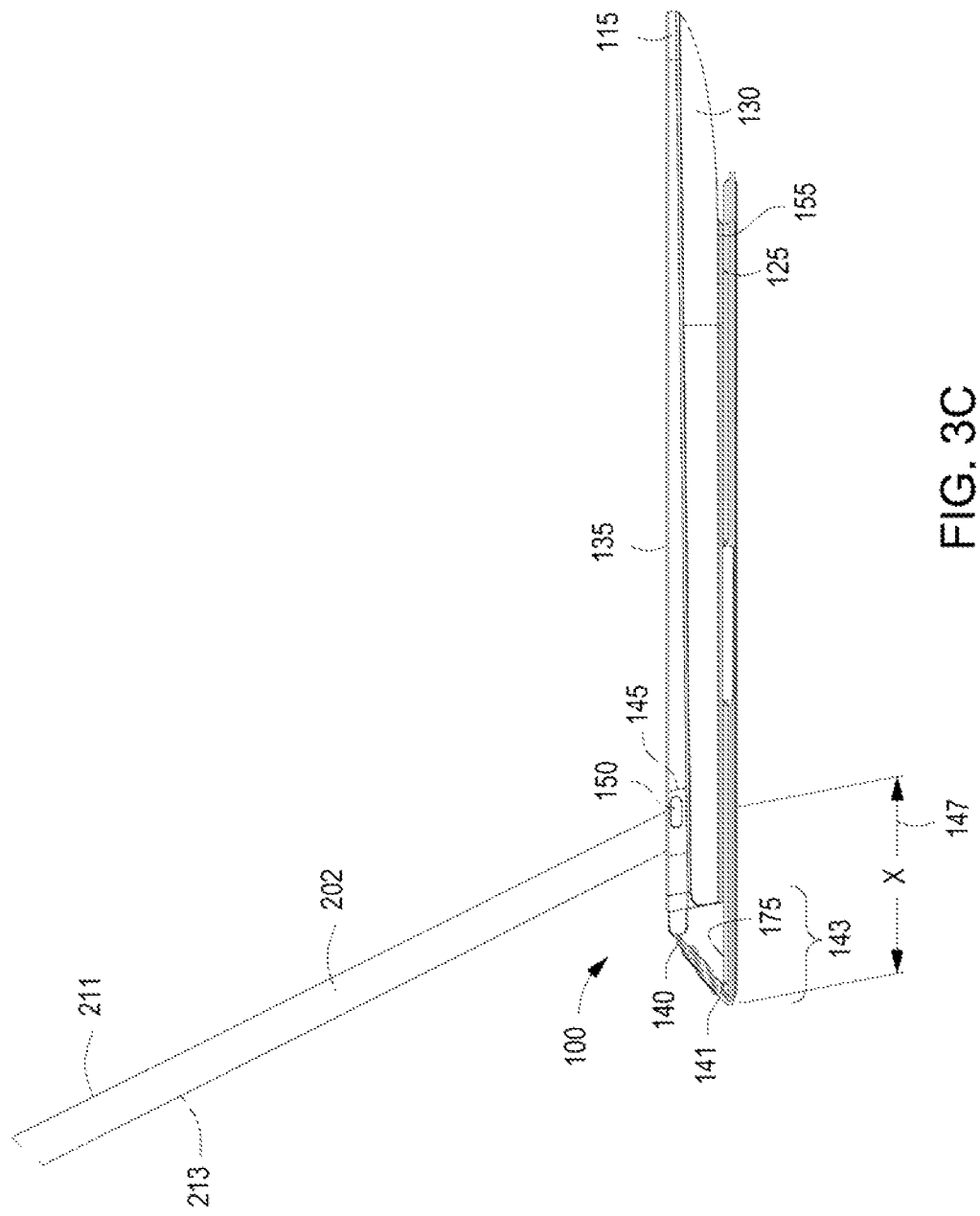
FIG. 3C illustrates a side view of an example computing device sleeve with an associated computing device.

FIG. 3C shows a side view of the mobile computing device sleeve 100 with the tablet computer 210 disposed in the docking slot 145. As shown, the tablet computer device 210 can sit at an angle relative to the top surface 135 of the main body element 130. The dimension X 147 provides a stabilizing foot that includes region 143 of the top cover element 170. The dimension X 147 adds additional leverage to the base formed by the second surface 175 of the top cover region 150 when a user presses on the front surface 211 (e.g. a touchscreen) of the tablet computer 210.

Figure 4A:
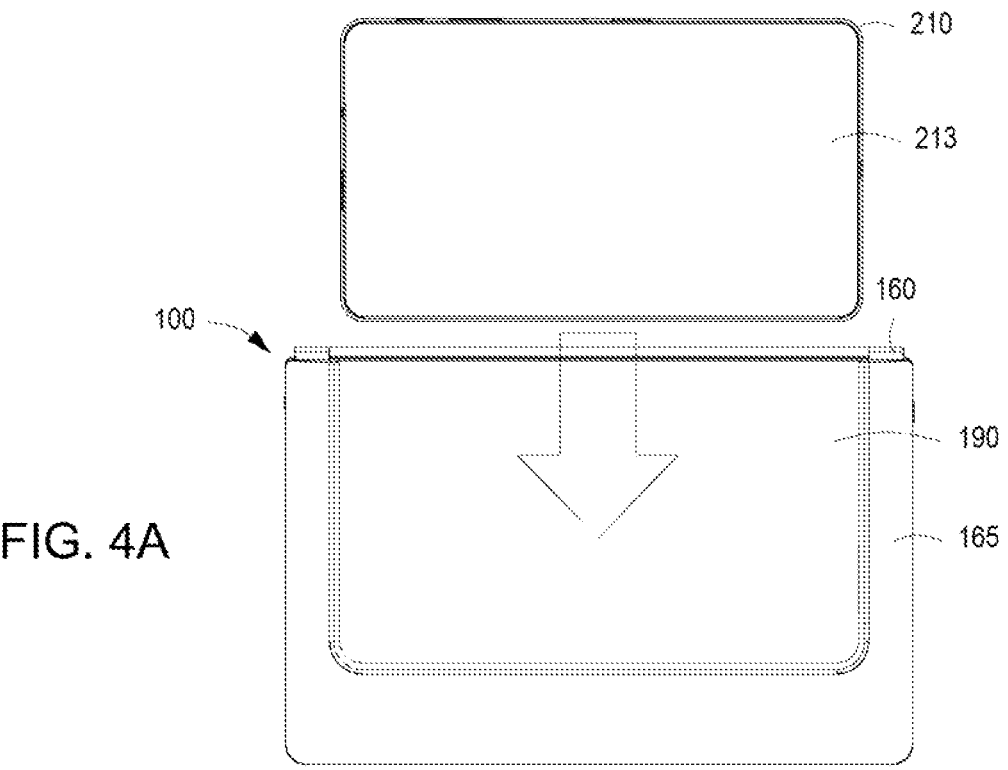
FIG. 4A illustrates a back view of an insertion of a computing device into an example computing device sleeve.
Figure 4B:
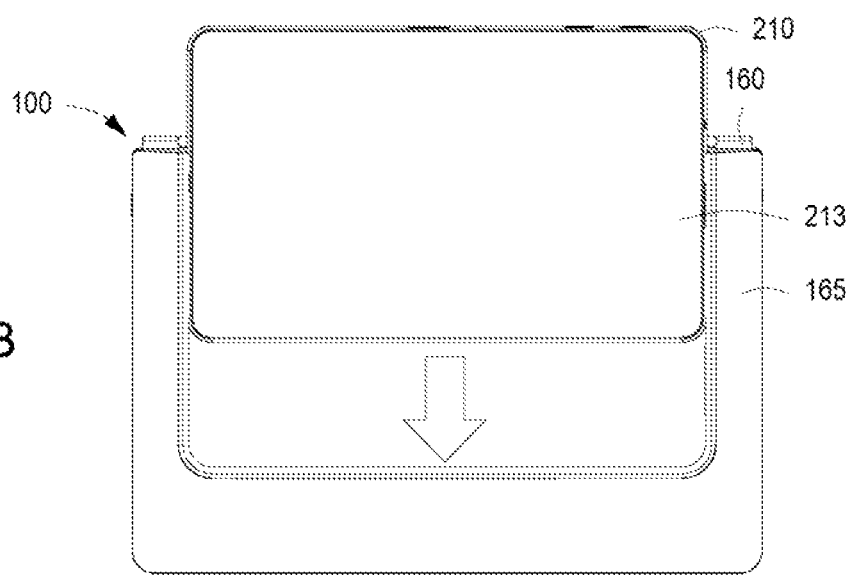
FIG. 4B illustrates a back view of an insertion of a computing device into an example computing device sleeve
Figure 4C:
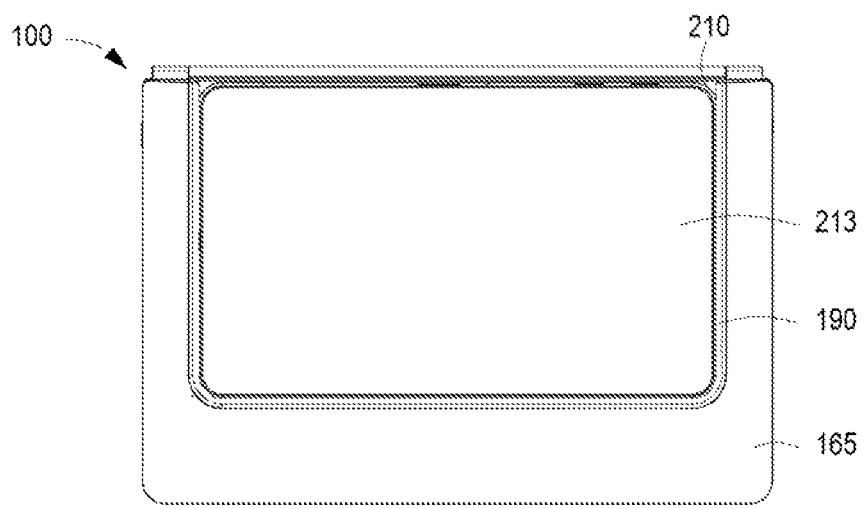
FIG. 4C illustrates a back view of a computing device inserted into an example computing device sleeve.

In various implementations, the mobile device sleeve 100 can include a recess 190 disposed in the bottom surface 165 of the main body element 130. When the top cover element 170 is disposed in the closed state or position, the edge of the main body element 130 adjacent the pivot region 160 can include a cutout with a keyed profile for inserting the tablet computing device 210. For example, the sidewalls of the recessed region 190 can match the profile of the side edges of the tablet computing device 210. In such implementations, the tablet computing device 210 can be moved along a direction 401 into the recess 190 with its front surface 211 facing the interior of the recess 190 and the exterior surface 213 (e.g., the back of the tablet computing device) facing the exterior of the main body component 130. FIG. 48 illustrates the tablet computing device 210 partially inserted into the recess 190. FIG. 4C illustrates the tablet computing device 210 fully inserted into the recess 190.

Figure 5:
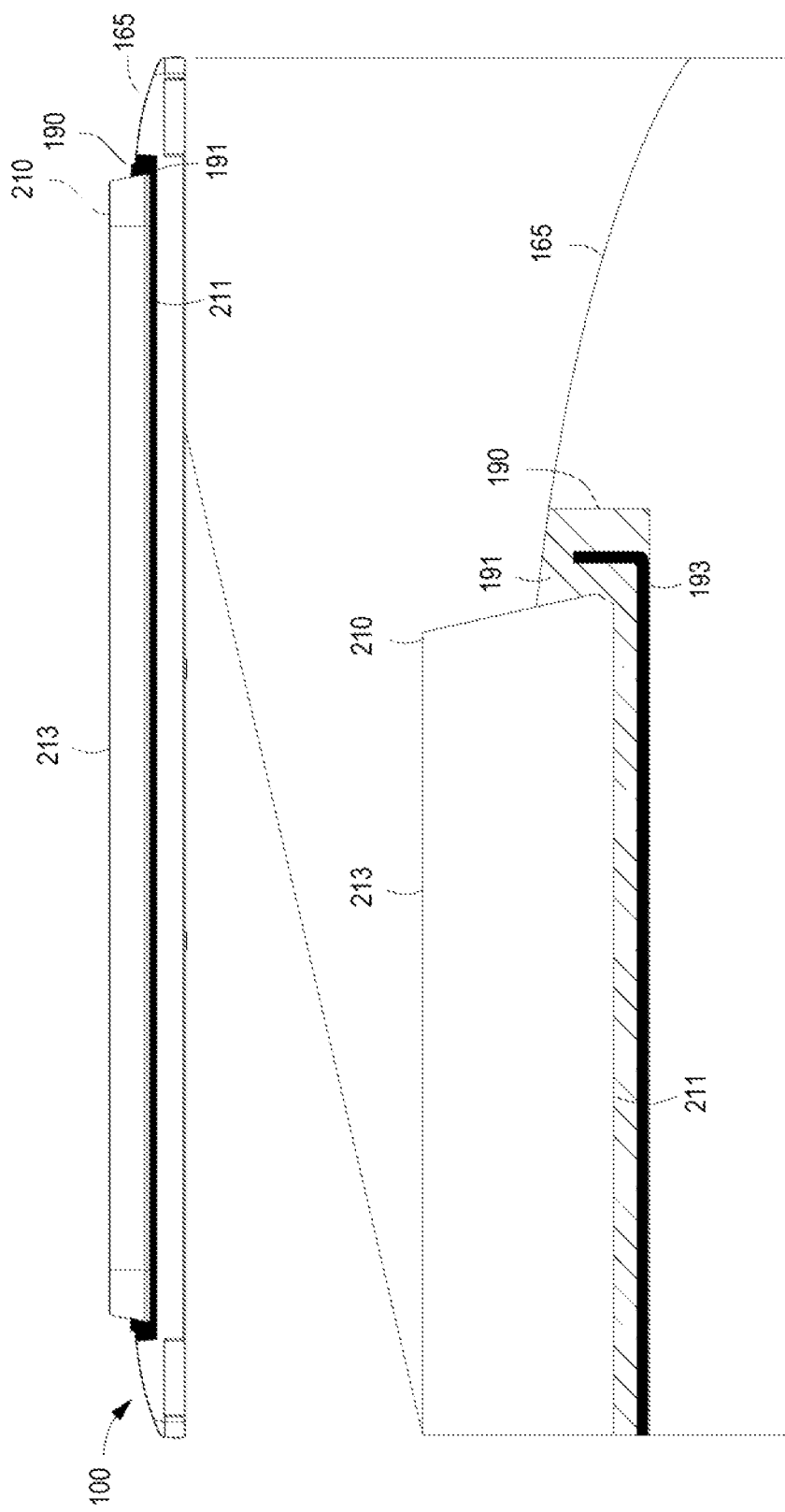
FIG. 5 depicts a detailed top view of the coupling region between an example computing device sleeve and a computing device.

FIG. 5 illustrates a detailed view of the edge of the main body element 130 adjacent to the pivot regions 160. As shown, the interior of the recessed region 190 can include a material 191 that creates sufficient friction between the front surface 211 of the tablet computing device 210 to hold the tablet computing device 210 it in place in the recessed region 190. The material 191 can include various rubbers, plastics, felts, and the like.

In some implementations, the profile of the material 191, the sidewalls of the recessed region 190, and/or an internal support element 193 can create a sidewall profile that matches the side profile 215 of the tablet computer device 210. The internal support structure 193 can include a rigid materials such as a metal frame, plastic frame, or other suitably rigid material disposed within the material 191 to provide shape to the semi-flexible material 191 to create a corresponding profile. With the keyed profile of the sidewalls of the recessed region 190 and the tablet computing device 210 matched, the tablet computing device 210 is captured and, thus, prevented from being removed from the recessed region in a direction substantially perpendicular to the surface 135 of the main body element 130. In the example shown, the sidewall 215 creates a trapezoidal profile relative to the back surface 213 and the front service 211.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. A computing device sleeve comprising:
    a main body element comprising a top surface and a bottom surface, the bottom surface comprising a recessed region to store a tablet computing device, wherein the main body element comprises a docking slot in the top surface in which the tablet computing device is insertable to position the tablet computing device to provide a user with a view of a display of the tablet computing device, the tablet computing device insertable in the docking slot after removal from the recessed region;
    a hinge; and
    a top cover element pivotally attached by the hinge to a first side of the main body element to selectively cover the top surface when the top cover element is at a first position, and cover the bottom surface after the top cover element is pivoted at the hinge from the first position to a second position, wherein when the top cover element is at the second position and covers the bottom surface of the main body element, the top cover element covers the recessed region.

2. The computing device sleeve of claim 1, wherein the recessed region comprises sidewalls with a profile that matches a profile of sides of the tablet computing device.

3. The computing device sleeve of claim 2, wherein the profile of the sidewalls are keyed to the sides of the tablet computing device to prevent the tablet computing device from being removed in a direction perpendicular to the bottom surface.

4. The computing device sleeve of claim 1, wherein the recessed region comprises a flexible material to provide friction to hold the tablet computing device.

5. The computing device sleeve of claim 1, wherein the recessed region comprises an open side through which to receive the table computing device.

6. The computing device sleeve of claim 1, wherein the top surface comprises a user input device, and the docking slot is to hold the tablet computing device at an angle relative to the top surface and the input device.

7. The computing device sleeve of claim 1, wherein the top cover element comprises:
    a rigid body element;
    a first flexible region attached to the rigid body element;
    an intermediate rigid region attached to the first flexible region; and
    a second flexible region attached to the intermediate rigid region.

8. The computer device sleeve of claim 7, wherein the first flexible region, the intermediate rigid region, and the second flexible region are disposed adjacent a first side of the rigid body element, and the top cover element is attached to the main body element by the second flexible region.

9. The computing device sleeve of claim 8, wherein the rigid body element comprises a magnet disposed on a second side of the rigid body element, the bottom surface comprises a corresponding magnet or magnetic element such that when the top cover element is disposed adjacent the bottom surface, the top cover element is held in a position that causes the rigid body element to extend beyond the bottom surface at the first side of the main body element.

10. The computing device sleeve of claim 9, wherein the rigid body element is held at an acute angle to the intermediate rigid region when the top cover element is at the second position.

11. The computing device sleeve of claim 1, wherein the computing device sleeve is in a closed configuration when the top cover element is at the first position, and wherein in the closed configuration the recessed region is accessible to insert the tablet computing device.

12. A computing device sleeve comprising:
    a main body element comprising a top surface and a bottom surface, the bottom surface comprising a recessed region to removably receive a tablet computing device in a position to protect a display device of the tablet computing device, and the top surface comprising a user input device and a docking slot to receive the tablet computing device, wherein the tablet computing device is insertable in the docking slot to position the tablet computing device to provide a user with a view of the display device of the tablet computing device, the tablet computing device insertable in the docking slot after removal from the recessed region;
    a hinge; and
    a top cover element pivotally attached by the hinge to a first side of the main body element and pivotable to selectively cover the top surface when the top cover element is at a first position, and cover the bottom surface after the top cover element is pivoted at the hinge from the first position to a second position, wherein when the top cover element is at the second position and covers the bottom surface of the main body element, the top cover element covers the recessed region.

13. The computing device sleeve of claim 12, wherein the recessed region comprises keyed sidewalls to match sides of the tablet computing device that when mated prevent the tablet computing device from being removed from the computing device sleeve in a direction perpendicular to the bottom surface.

14. The computing device sleeve of claim 12, wherein the top cover element forms a stabilizing foot beyond the first side of the main body element when the top cover element is positioned to cover the bottom surface.

15. The computing device sleeve of claim 12, wherein the recessed region comprises a flexible material to hold the table computing device.

16. The computing device sleeve of claim 12, wherein top surface and the bottom surface comprise magnetic elements to hold the top cover element in place over the top surface or the bottom surface.

17. The computing device sleeve of claim 12, wherein the computing device sleeve is in a closed configuration when the top cover element is at the first position, and wherein in the closed configuration the recessed region is accessible to insert the tablet computing device, and the docking slot is covered by the top cover element.

18. The computing device sleeve of claim 17, wherein the computing device sleeve is in an open configuration when the top cover element is at the second position, and wherein in the open configuration the docking slot is exposed to receive the tablet computing device.

19. A method of providing a computing device sleeve, comprising:
  providing a main body element comprising a top surface and a bottom surface, the bottom surface comprising a recessed region to removably store a tablet computing device;
  providing a docking slot in the top surface of the main body element, wherein the tablet computing device is insertable in the docking slot to position the tablet computing device to provide a user with a view of a display of the tablet computing device, the tablet computing device insertable in the docking slot after removal from the recessed region; and
  pivotally attaching a top cover element by a hinge to a first side of the main body element to selectively cover the top surface when the top cover element is at a first position, and cover the bottom surface after the top cover element is pivoted at the hinge from the first position to a second position, wherein when the top cover element is at the second position and covers the bottom surface of the main body element, the top cover element covers the recessed region.

20. The method of claim 19, wherein the computing device sleeve is in a closed configuration when the top cover element is at the first position, and wherein in the closed configuration the recessed region is accessible to insert the tablet computing device.

* * * * *

UNITED STATES PATENT AND TRADEMARK OFFICE
CERTIFICATE OF CORRECTION

PATENT NO. : 9,780,825 B2  
APPLICATION NO. : 14/957022  
DATED : October 3, 2017  
INVENTOR(S) : Cha et al.

Page 1 of 1

It is certified that error appears in the above-identified patent and that said Letters Patent is hereby corrected as shown below:

On the Title Page

In Column 2, Item (56), Foreign Patent Documents, Line 1, delete "WO-2014110557" and insert -- WO-2014110567 --, therefor.

Signed and Sealed this  
Twentieth Day of February, 2018

Andrei Iancu  
*Director of the United States Patent and Trademark Office*